D. BOURQUE.
TURN BUTTON FASTENER.
APPLICATION FILED OCT. 25, 1917.

1,292,424.

Patented Jan. 28, 1919.

Inventor:
David Bourque.
by Emery, Booth, Janney & Varney
Attys.

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

TURN-BUTTON FASTENER.

1,292,424.   Specification of Letters Patent.   Patented Jan. 28, 1919.

Application filed October 25, 1917. Serial No. 198,531.

*To all whom it may concern:*

Be it known that I, DAVID BOURQUE, a citizen of the United States, and a resident of Amesbury, in the county of Essex and Commonwealth of Massachusetts, have invented an Improvement in Turn-Button Fasteners, of which the following description, in connection with the accompanying drawings, is a specification, like characters on the drawings representing like parts.

This invention relates to fasteners of that type having a movable part, usually rotatable, which in one position may be passed through an opening or eyelet and may then be adjusted to another or traversing position, so that it may not be withdrawn. Such fasteners are commonly used as fasteners for curtains on vehicles. The present invention aims to improve them with a view especially to increased ease of action and greater durability.

As an example of my invention I have herein illustrated a button fastener of the type shown in my Patent No. 1,201,682, and in the accompanying drawings to which in connection with the following description I will refer for a better understanding of my invention:—

Figure 1:
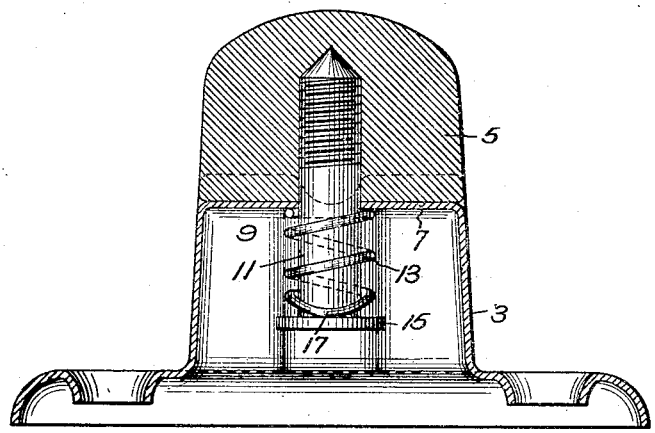
Figure 2:
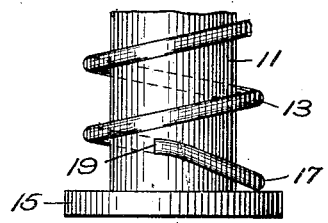

Figure 1 is a central longitudinal section on an enlarged scale of a fastener illustrating my invention; and Fig. 2 is a detail still further enlarged, the view being from the left of Fig. 1.

In the accompanying drawings the fastener includes a base 3 and a head or button 5 rotatably mounted thereon. I use the term button to apply to this part to distinguish it from a head later to be referred to. The word button has no particular connotation or significance. The base 3 is provided with cross grooves 7 and 9 indicated by dotted lines in Fig. 1, in which the button 5 is adapted to sit and it is secured in place by a headed shank 11 passing through the wall of the base and into the button. A spring 13, herein a helical spring, is interposed between the head 15 of shank 11 and the inner wall of base 3 and resiliently holds the button 5 in engagement with one of the grooves.

As is well understood, when the parts are in the position shown, an eyelet may be passed over the button 5 and the base 3. The button may then be turned to a traversing position, rising somewhat away from the base, which action is permitted by compression of the spring 13, and brought to a seat in the transverse groove 9. In this position it will lock the eyelet in place on the base 3 in well known manner.

To insure long life and easy working to the fastener I have herein so arranged the parts that there will be practically no friction and no wear. In the present instance I have arranged for a practically frictionless bearing between the spring 13 and the head 15 of the shank. Referring to Fig. 1, when a helical spring as shown is used, the terminal spire thereof is bent in an opposite sense to the pitch of the helix, providing a curved portion 17. The end 19 as seen in Fig. 2 is directed inwardly toward the preceding spire and is out of contact with the head 15. As seen in Fig. 1, the spring therefore presents smooth bearing to the head 15; and as seen in Fig. 2, since the wire itself is round, the bearing is substantially one-point bearing, the parts of the spring being curved away from the face of the head 15 at all sides of the point of contact.

When the button is manipulated the head 15 will turn therewith and because of the bearing provided at 17 will move freely over the spring which itself, because of the much greater friction at the other end, will remain stationary. If, on the other hand, the spring is constructed, as has been the custom hitherto, of a segment of a simple helix, not only is there much greater resistance to turning but the sharp corners where the wire was cut are presented both to the head of the shank and to the thin metal of the base 3. Under these circumstances it rapidly wears the parts and in fact it has been customary to provide case hardened pins or shanks 11 to take up this wear, but even this does not do away with the wear on the ductile and therefore soft metal from which the bases are formed. By my present construction not only is the operation of the entire fastener made easy but this wear is entirely done away with, since there is practically no wear on the head 15 of the shank because of the smooth nature of the contacting surface of the spring which forms a substantially frictionless bearing and the fact that the freedom of relative movement at this end of the fastener permits the spring to remain practically stationary as regards the base part 3, so that it has no wearing action thereon.

In the particular embodiment of my invention shown, the spring may be bent as indicated at 17 by the means used to coil the same from the original wire.

Having thus described an illustrative embodiment of my invention, what I claim as new and desire to secure by Letters Patent is:—

1. A fastener comprising a base, a rotatable button having a headed shank extending into said base and a helical spring encircling said shank and interposed between said base and head, having a terminal spire bent to provide a rounded portion bearing on said head.

2. A fastener comprising a base, a rotatable button having a headed shank extending into said base and a spring interposed between the base and head having provision facilitating rotation thereof relative to one of the same.

3. A fastener comprising a base, a rotatable button having a headed shank extending into said base and a spring interposed between the base and head having a portion of its surface bearing on one of the same and having its surface adjacent said portion curved away therefrom at all sides thereof.

4. A fastener comprising a base, a rotatable button having a headed shank extending into said base and a spring interposed between the base and head having a bearing portion of compound curvature providing substantially one point contact with said member.

5. A fastener comprising a base, a rotatable button having a headed shank extending into said base and a helical spring encircling said shank and interposed between said base and head, having an end bent inwardly.

In testimony whereof I have signed my name to this specification.

DAVID BOURQUE.

Copies of this patent may be obtained for five cents each, by addressing the "Commissioner of Patents, Washington, D. C."